(12) United States Patent
Noorshams et al.

(10) Patent No.: US 11,263,025 B2
(45) Date of Patent: Mar. 1, 2022

(54) PROACTIVELY PERFORMING TASKS BASED ON ESTIMATING HARDWARE RECONFIGURATION TIMES

(71) Applicant: INTERNATIONAL BUSINESS MACHINES CORPORATION, Armonk, NY (US)

(72) Inventors: Qais Noorshams, Boeblingen (DE); Simon Spinner, Stuttgart (DE); Norman Christopher Böwing, Boeblingen (DE); Marco Selig, Boeblingen (DE); Pradeep Parameshwaran, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 16/882,986

(22) Filed: May 26, 2020

(65) Prior Publication Data
US 2021/0373913 A1 Dec. 2, 2021

(51) Int. Cl.
*G06F 9/445* (2018.01)
*G06F 17/18* (2006.01)
(Continued)

(52) U.S. Cl.
CPC ........ *G06F 9/44505* (2013.01); *G06F 9/4843* (2013.01); *G06F 15/7871* (2013.01); *G06F 17/18* (2013.01)

(58) Field of Classification Search
CPC .............. G06F 9/44505; G06F 9/4843; G06F 15/7871; G06F 17/18
(Continued)

(56) References Cited

U.S. PATENT DOCUMENTS 6,256,773 B1  7/2001  Bowman-Amuah
6,874,108 B1 *  3/2005  Abramovici ....... G01R 31/3016
                                                   713/401
(Continued)

FOREIGN PATENT DOCUMENTS

CN   1366783 A   8/2002
CN   108207114 A   6/2018
(Continued)

OTHER PUBLICATIONS

International Search Report and Written Opinion, PCT/IB2021/053906, dated Aug. 16. 2021, pp. 7.
(Continued)

*Primary Examiner* — Paul R. Myers
(74) *Attorney, Agent, or Firm* — Edward Wixted, Esq.; Blanche E. Schiller, Esq.; Heslin Rothenberg Farley & Mesiti P.C.

(57) ABSTRACT

Proactively performing tasks based on estimating hardware reconfiguration times. A determination is made, prior to performing one or more reconfiguration actions to reconfigure a configuration of the computing environment, at least one estimated reconfiguration time to perform the one or more reconfiguration actions. At least one reconfiguration action of the one or more reconfiguration actions is performed, and one or more tasks are initiated prior to completing the one or more reconfiguration actions. The initiating is based on the at least one estimated reconfiguration time.

20 Claims, 11 Drawing Sheets

(51) Int. Cl.
*G06F 15/78* (2006.01)
*G06F 9/48* (2006.01)

(58) Field of Classification Search
USPC .......................................................... 713/100
See application file for complete search history.

(56) References Cited

U.S. PATENT DOCUMENTS

| | | | |
|---|---|---|---|
| 8,430,299 | B2 | 4/2013 | Poslinski et al. |
| 8,688,488 | B2 | 4/2014 | Malnati et al. |
| 10,289,453 | B1 | 5/2019 | Wei et al. |
| 10,389,453 | B2 | 5/2019 | Wei et al. |
| 10,915,361 | B1* | 2/2021 | Lin .................... H04L 41/0816 |
| 2001/0049769 | A1 | 12/2001 | Ono |
| 2008/0268840 | A1* | 10/2008 | McDonald ............ H04W 76/22 455/435.1 |
| 2009/0037442 | A1 | 2/2009 | Yuan et al. |
| 2009/0037553 | A1 | 2/2009 | Yuan et al. |
| 2009/0158293 | A1* | 6/2009 | Kajihara ............... G06F 9/4881 718/106 |
| 2015/0113131 | A1* | 4/2015 | Veenstra ............... H04L 41/147 709/224 |
| 2018/0107511 | A1* | 4/2018 | Katayama ............. G06F 9/4881 |
| 2020/0034188 | A1* | 1/2020 | Strack .................. G06F 9/5038 |

FOREIGN PATENT DOCUMENTS

| | | |
|---|---|---|
| CN | 110063051 A | 7/2019 |
| CN | 110390345 A | 10/2019 |
| EP | 2996075 | 3/2016 |

OTHER PUBLICATIONS

Ibm, "z/Architecture—Principles of Operation," IBM Publication No. SA22-7832-12, Thirteenth Edition, Sep. 2019, pp. 1-2000.
Mell, Peter and Tim Grance, "The NIST Definition of Cloud Computing," National Institute of Standards and Technology, Information Technology Laboratory, Special Publication 800-145, Sep. 2011, pp. 1-7.
Abella, Juame et al., "Measurement-Based Worst-Case Execution Time Estimation Using the Coefficient of Variation," ACM Transactions on Design Automation of Electronic Systems, vol. 22, No. 4, Article 72, Jun. 2017, pp. 72-72:29.
Frantzen, Marcus et al., "A Simulation-Based Scheduling System for Real-Time Optimization and Decision Making Support," Robotics and Computer-Integrating Manufacturing, Feb. 2011, pp. 696-705.
Goren, Selcuk et al., "Taking Advantage of a Diverse Set of Efficient Production Schedules: A Two-Step Approach for Scheduling with Side Concerns," Computers and Operations Reasearch, Mar. 2013, pp. 1979-1990.
Gummadi, Krishna et al., "King: Estimating Latency Between Arbitrary Internet End Hosts," IMW '02: Proceedings of the 2nd ACM SIGCOMM Workshop on Internet Measurement, Nov. 2002, pp. 1-14.
Hansen, Jeffrey et al., "Statistical-Based WCET Estimation and Validation," $9^{th}$ International Workshop on Worst-Case Execution Time (WCET) Analysis, Jul. 2009, pp. 1-11.
Liu, Ying et al., "ProRenaTa: Proactive and Reactive Tuning to Scale a Distributed Storage System," 2015 $15^{th}$ IEEE/ACM International Symposium on Cluster, Cloud and Grid Computing, Feb. 2015, pp. 453-464.
Wang, Xi et al., "Dynamic Multiple-Period Reconfiguration of Real-Time Scheduling Based on Timed DES Supervisory Control," IEEE Transactions on Industrial Informatics, vol. 12, No. 1, Feb. 2016, pp. 101-111.
Zhang, Xiaokun et al., "A Multi-level Reconfiguration Control for Holonic PLC," 2000 IEEE International Conference on Systems, Man and Cybernetics, Oct. 2000, pp. 1762-1767.

* cited by examiner

PROACTIVELY PERFORMING TASKS BASED ON ESTIMATING HARDWARE RECONFIGURATION TIMES

BACKGROUND

One or more aspects relate, in general, to facilitating processing within a computing environment, and in particular, to dynamically reconfiguring hardware of the computing environment to facilitate processing within the computing environment.

Configuration of a computing environment includes defining and activating various hardware and software components of the computing environment, including, but not limited to, logical partitions, input/output (I/O) configurations, operating systems, etc. Products may be used to facilitate such configuration. For example, a Hardware Configuration Definition (HCD) product, offered by International Business Machines Corporation, Armonk, N.Y., is used to define and activate the I/O configuration.

The Hardware Configuration Definition product provides a panel-driven interface that enables the definition of elements, such as I/O devices, and connects them to logical partitions and operating systems for their use. The Hardware Configuration Definition product and other such products may also be used in reconfiguring the computing environment once configured.

SUMMARY

Shortcomings of the prior art are overcome, and additional advantages are provided through the provision of a computer program product for facilitating processing within a computing environment. The computer program product includes at least one computer readable storage medium readable by at least one processing circuit and storing instructions for performing a method. The method includes determining, prior to performing one or more reconfiguration actions to reconfigure a configuration of the computing environment, at least one estimated reconfiguration time to perform the one or more reconfiguration actions. At least one reconfiguration action of the one or more reconfiguration actions is performed. One or more tasks are initiated prior to completing the one or more reconfiguration actions, wherein the initiating is based on the at least one estimated reconfiguration time.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects relate to system reconfiguration, such as dynamic hardware reconfiguration within a computing environment. Dynamic hardware reconfiguration enables hardware and software components of a computing environment, such as logical partitions, control units, input/output (I/O) devices, operating systems, etc., to be reconfigured without requiring an initial program load (IPL) or a power on reset (POR). For instance, one or more aspects relate to proactively performing (e.g., initiating and/or processing) selected tasks (e.g., follow-on tasks) based on estimated reconfiguration times for performing a reconfiguration, such as a dynamic hardware reconfiguration.

As one example, a capability is provided to measure the time used to determine one or more reconfiguration actions to be performed to reconfigure a computing environment, and to estimate, in advance of performing the reconfiguration, how long it will take to perform the one or more reconfiguration actions, providing at least one estimated reconfiguration time. The at least one estimated reconfiguration time is used to proactively perform (e.g., initiate and/or process) selected tasks prior to completing the reconfiguration (i.e., prior to completing processing of the one or more reconfiguration actions used to reconfigure the computing environment). This enables those tasks to be processed as soon as possible, reducing system downtime and keeping system downtime to a minimum.

The capability further includes, in another aspect, recalculating estimated reconfiguration times using measured reconfiguration times determined during processing of the one or more reconfiguration actions in order to adjust the at least one estimated reconfiguration time. This improves the at least one estimated reconfiguration time enabling future reconfiguration times to be estimated with a higher accuracy.

Figure 1A:
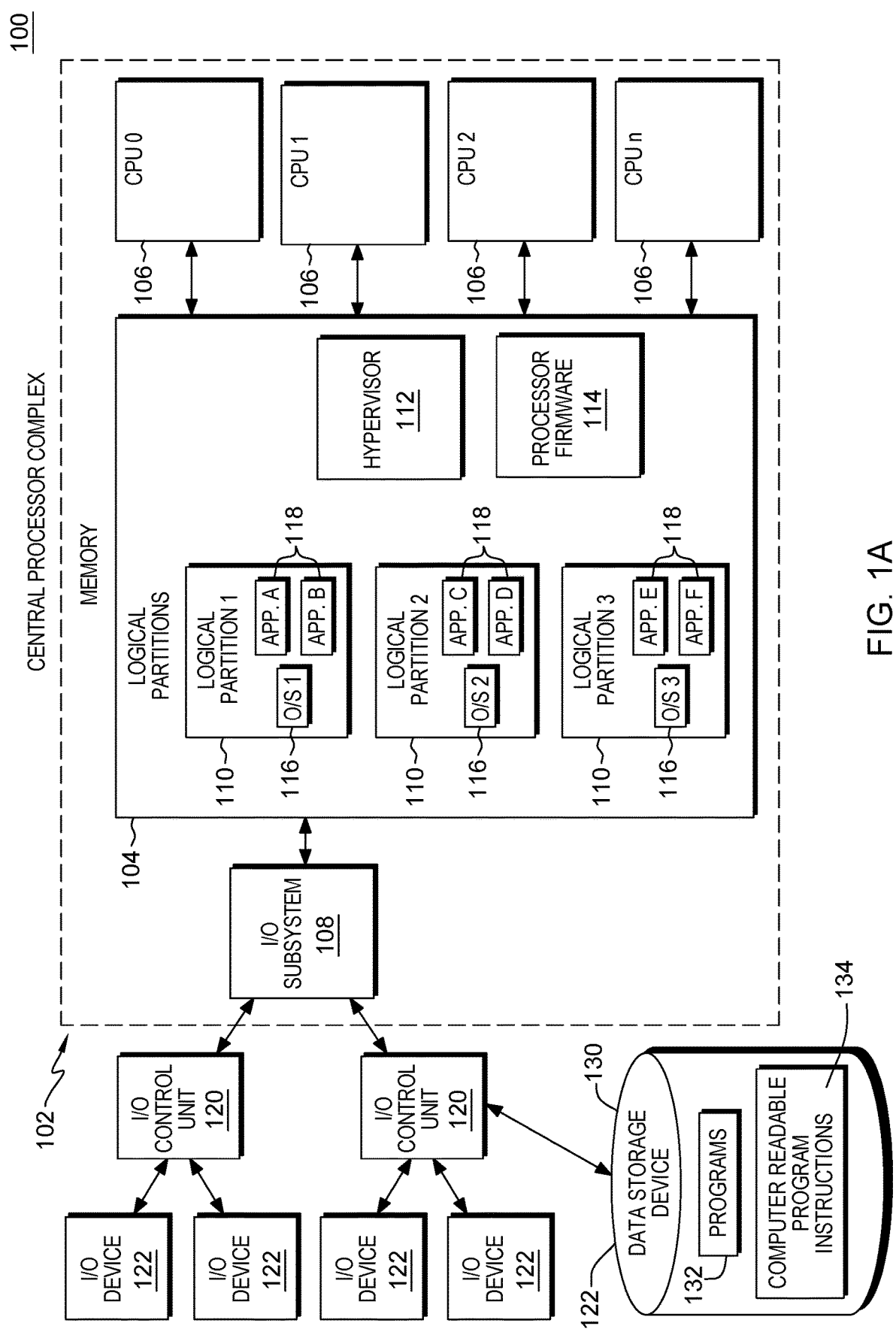
FIG. 1A depicts one example of a computing environment to incorporate and use one or more aspects of the present invention.

One embodiment of a computing environment to incorporate and use one or more aspects of the present invention is described with reference to FIG. 1A. In one example, the computing environment is based on the z/Architecture® hardware architecture, an example of which is described in a publication entitled, "z/Architecture Principles of Operation," IBM Publication No. SA22-7832-12, 13$^{th}$ edition, September 2019, which is hereby incorporated herein by reference in its entirety. The z/Architecture hardware architecture, however, is only one example architecture; other architectures and/or other types of computing environments may include and/or use one or more aspects of the present invention.

In one example, a computing environment 100 includes a central processor complex 102, an example of which is an IBM Z® central processor complex, that includes one or more IBM z15™ systems, as a particular example. Other central processor complexes, and/or other systems based on the same or other hardware architectures may also incorporate and use one or more aspects of the present invention. IBM, z/Architecture, IBM Z, and IBM z15 are trademarks or registered trademarks of International Business Machines Corporation in at least one jurisdiction. As an example, central processor complex 102 includes, for instance, a memory 104 (a.k.a., system memory, main memory, main storage, central storage, storage) coupled to one or more processors (a.k.a., central processing units (CPUs)) 106, and to an input/output subsystem 108, each of which is described further below.

Memory 104 includes, for example, one or more logical partitions 110, a hypervisor 112 that manages the logical partitions, and processor firmware 114. One example of hypervisor 112 is the Processor Resource/System Manager (PR/SM™) hypervisor, offered by International Business Machines Corporation, Armonk, N.Y. As used herein, firmware includes, e.g., the microcode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 110 is capable of running an operating system 116, such as a z/OS operating system, or another operating system, and operating with different programs 118. z/OS is a trademark or registered trademark of International Business Machines Corporation in at least one jurisdiction.

Memory 104 is coupled to processors (e.g., CPUs) 106, which are physical processor resources that may be allocated to the logical partitions. For instance, a logical partition 110 includes one or more logical processors, each of which represents all or a share of a physical processor resource 106 that may be dynamically allocated to the logical partition.

Further, memory 104 is coupled to I/O subsystem 108. I/O subsystem 108 may be a part of the central processor complex or separate therefrom. It directs the flow of information between main storage 104 and input/output control units 120 and/or input/output (I/O) devices 122 coupled to the central processor complex.

Many types of I/O devices 122 may be used. One particular type is a data storage device 130. Data storage device 130 may store one or more programs 132, one or more computer readable program instructions 134, and/or data, etc. The computer readable program instructions may be configured to carry out functions of embodiments of aspects of the invention.

Central processor complex 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode, device drivers, redundant processing units, external disk drive arrays, RAID systems, tape drives, and data archival storage systems, etc.

Moreover, central processor complex 102 may be operational with numerous other general-purpose or special purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
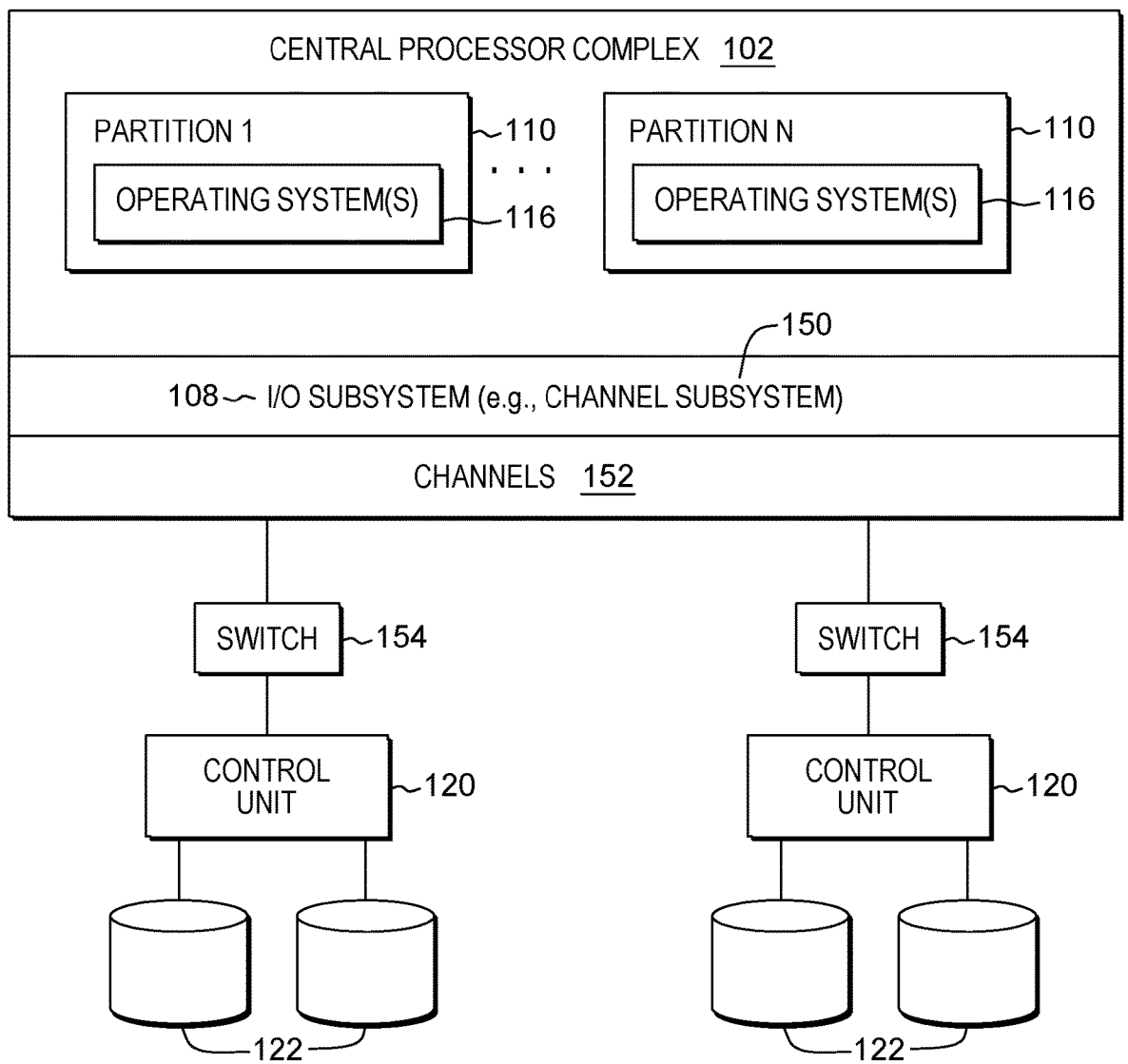
FIG. 1B depicts one example of further details of the computing environment of FIG. 1A, in accordance with one or more aspects of the present invention.

Further details regarding one embodiment of a computing environment, such as computing environment 100, are described with reference to FIG. 1B. In one embodiment, input/output (I/O) subsystem 108 is a channel subsystem 150 which receives commands in channel programs from one or more operating systems (e.g., operating system 116). A channel program includes one or more channel command words (CCWs), and each channel command word includes a command (e.g., read, write, control) and a data address for use in data communication. The channel subsystem forwards the commands, via, e.g., channels 152, to one or more communication components of the computing environment, such as to one or more switches 154, which are coupled, in one example, to one or more control units 120. The one or more control units are coupled to one or more I/O devices 122. The one or more switches obtain the requested information, based on the commands, from, e.g., one or more I/O devices 122, and return results back to the operating system(s).

In accordance with one or more aspects, a computing environment, such as computing environment 100, may be dynamically reconfigured by, for instance, adding, modifying and/or deleting one or more logical partitions, one or more control units, and/or one or more devices, as examples. To perform hardware reconfiguration, in one example, a hardware configuration definition is used, as described with reference to FIG. 2.

Figure 2:
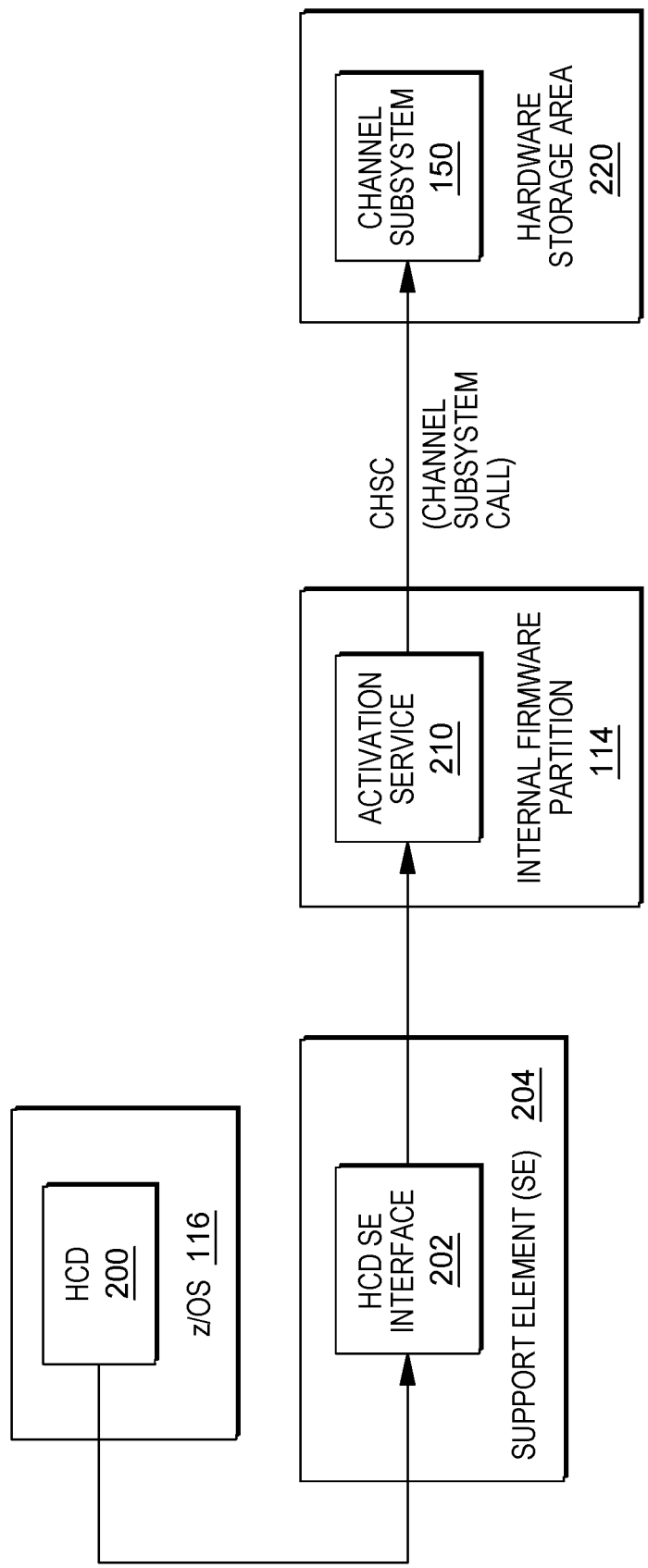
FIG. 2 depicts one example of using an activation service to reconfigure a hardware configuration, in accordance with one or more aspects of the present invention.

As shown in FIG. 2, in one example, a Hardware Configuration Definition (HCD) product 200, runs on an operating system, such as operating system 116 (e.g., z/OS operating system). Hardware Configuration Definition product 200 is used to define and activate I/O configurations of one or more servers (e.g., IBM z Servers) of the computing environment (e.g., computing environment 100) and its operating systems. For example, Hardware Configuration Definition product 200 enables the definition of elements, such as I/O devices from storage systems, and to connect them to the partitions and operating systems for their use over a series of other I/O elements.

In one example, Hardware Configuration Definition product 200 is a panel-driven interface that facilitates definition of elements of the computing environment and communicates with an interface, such as an HCD support element (SE) interface 202, which is executed on a support element 204. Support element 204 is, for instance, a notebook or server coupled to the central processor complex. It may be part of the central processor complex or separate therefrom. HCD support element interface 202 is, for instance, a command-line interface that communicates with a service, such as an activation service 210, executing on an internal firmware partition (e.g., processor firmware 114).

The activation service is used, in one embodiment, to at least initiate the requested configuration changes. For instance, in one example, the activation service makes calls (e.g., channel subsystem (CHSC) calls) to a channel subsystem (e.g., channel subsystem 150) to perform individual changes, such as define partitions, add/modify/delete channels, control units and/or I/O devices, as examples, and to store the information in a hardware storage area 220. Although various configuration changes are provided as examples, many other configuration changes may be made without departing from aspects of the present invention.

In one embodiment, to change a system configuration, a system administrator proceeds through a series of preparation steps. Thereafter, a dynamic hardware activate phase is started and the system administrator waits for completion, which could take several hours, even days, depending on the reconfiguration. The administrator has no control of the time it will take the activation (e.g., reconfiguration) to complete. This makes the scheduling of additional reconfiguration or other maintenance activities complex, and to be on the safe side, the size of a maintenance window or time-frame is made too large. Thus, in accordance with an aspect of the present invention, empirical statistics are used to predict the activation or reconfiguration time. The predicted time estimate is available in advance, such that maintenance can be scheduled accordingly with confidence and without needing a window size that is too large.

Although the system administrator is described herein as managing the configuration/reconfiguration, in other embodiments, it may be other administrators, users or even a computing system or component that is configured to determine reconfiguration changes, perform the preparation steps, schedule maintenance, etc.

To predict the reconfiguration time to perform a requested system reconfiguration and to manage the time used for a reconfiguration process, in one aspect, a capability is provided to monitor and measure the time(s) used to determine the hardware reconfiguration changes to be performed, and to provide estimates relating to actual reconfiguration changes. This capability includes, for instance, measuring the time used to determine the hardware reconfiguration changes to be performed (e.g., the time used to determine the particular reconfiguration actions to be performed to reconfigure the system based on the reconfiguration request); estimating the actual hardware reconfiguration times in advance; observing and self-adjusting the estimations based on the running reconfiguration during and/or based on the actual reconfiguration; and triggering the preparation of selected tasks, such as workload continuation (e.g., notifying the administrator, initiating workload migration, etc.) upon near completion (e.g., when only certain actions (e.g., add actions) remain to be performed; after particular groups of actions are performed, etc.).

Figure 3:
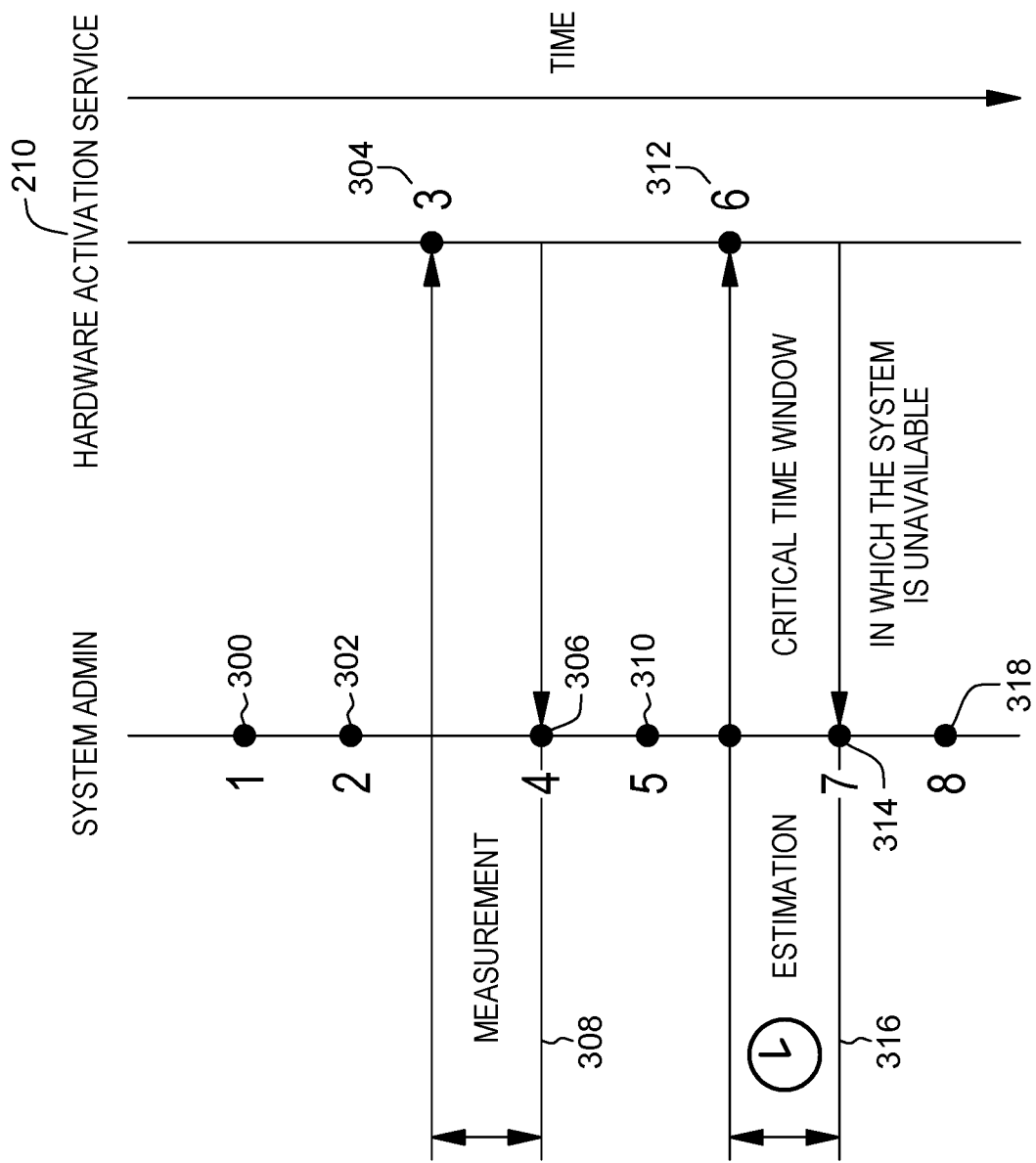
FIG. 3 depicts one example of a reconfiguration process, in accordance with one or more aspects of the present invention.

Further details regarding the monitoring, measuring and estimating are described with reference to FIG. 3. In accordance with an aspect of the present invention, one or more hardware changes are planned (e.g., by the system administrator, or automatically by a processor based on processing within the computing environment), STEP 300. Based on the planned changes, a proposed configuration is defined, STEP 302. For instance, a requested configuration is compared with the current configuration to determine the changes to be made, and one or more reconfiguration actions to be performed to reconfigure the configuration, without putting the changes into effect, are identified. Test activation of the proposed configuration is then performed using an activation service, e.g., hardware activation service 210, which may use one or more other components, STEP 304. The test activation includes, for instance, estimating at least one reconfiguration time for the identified reconfiguration actions. The system administrator (and/or processor) waits for the test results, which are then analyzed, STEP 306.

Further, in accordance with an aspect of the present invention, a measurement is performed of the time it took to compare the configurations and to identify the actions to be performed to reconfigure the computing environment, as specified by the proposed configuration, STEP 308.

Optionally, if there are dynamic software activations to be performed, then they are performed, STEP 310. Additionally, the requested dynamic hardware activations are performed to reconfigure the computing environment, STEP 312. For instance, the identified reconfiguration actions are performed, and the administrator (and/or processor) waits for the results, STEP 314. During this activate time, the system is unavailable. Based on the results (or at least partial results) of the reconfiguration, one or more follow-up tasks are triggered, STEP 318. In accordance with an aspect of the present invention, one or more follow-up tasks are triggered in advance of completing the reconfiguration, based on, for instance, estimated reconfiguration times.

Moreover, in accordance with an aspect of the present invention, one or more estimated reconfiguration time(s) are recalculated, during and/or based on the actual reconfiguration (i.e., between STEPS 312 and 314), STEP 316. For instance, the time taken to perform each of the identified reconfiguration actions is measured and used to recalculate (or adjust) the estimated reconfiguration time(s).

In one example, to estimate the reconfiguration time(s) (e.g., during test activate and/or during activate), one or more of the following equations may be used, in one example:

$$C = (c_1, c_2, \ldots, c_i)$$

$$T_{success} = m_p + \sum_i^{|C|} t(c_i)$$

$$T_{rollback} \leq T_{success} + \sum_j^{|C|} t(c_j^{-1})$$

Where: C is a list of commands, such as CHSC commands, to perform the reconfiguration (e.g., add, delete, modify); |C| is the number of elements in C; $c_j^{-1}$ is the revert of $c_i$; $T_{success}$: Time for a successful reconfiguration; $T_{rollback}$: Time for a rolled back reconfiguration; $m_p$: Time needed for preparation; t(c): Time to issue command c.

In one example, the function t(c) is a multi-dimensional function, which is learned, for instance, from observations using multi-dimensional regression analysis techniques. One example of a multi-dimensional regression analysis technique is a Least Squares technique; other techniques may also be used. The function t(c) is a multi-dimensional function on certain properties of c:

type (c): The element type to be reconfigured (e.g., control unit, I/O device, logical partition, etc.);

operation (c): The specific subcommand of a type (e.g., add, modify, delete);

css (c): The channel subsystem (CSS) index where the element is placed;

elementCount (c): The number of elements (e.g., CHSC elements) with the same type in the same CSS; and shareability (c): The degree of shareability of an element.

Although in the above example certain independent variables are identified (e.g., properties of c), more, fewer and/or different variables may be used. Further, although in the above example the channel subsystem is used as one example, in other examples, other I/O subsystems may be used. Many variations are possible.

In one embodiment, to perform reconfiguration a number of components may be used. Examples of these components are described with reference to FIG. 4. These components may be included or run on one processor, or one or more of the components may be distributed among one or more processors. Many variations are possible. In one example, firmware 114 includes one or more of the functions performed by one or more of the components. Further, although specific components are mentioned, these are only examples. More, fewer and/or different components may be used.

Figure 4:
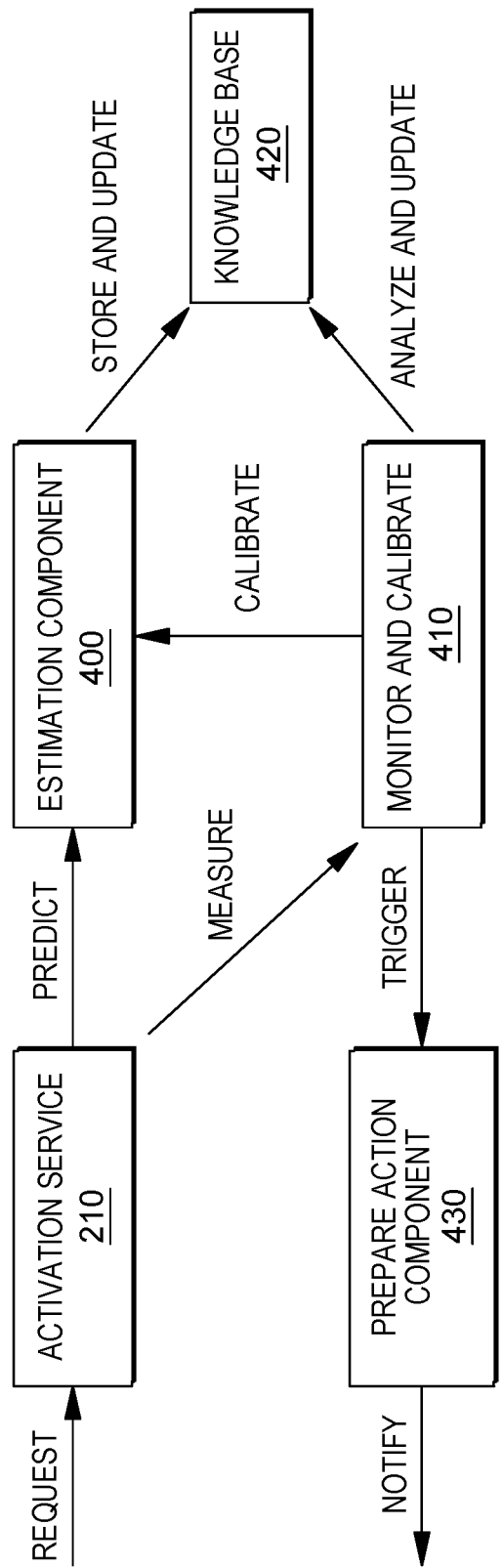
FIG. 4 depicts one example of components used to reconfigure a hardware configuration, in accordance with one or more aspects of the present invention.

Referring to FIG. 4, in one example, a reconfiguration request is obtained (e.g., received, provided, pulled, etc.) by an activation service, e.g., activation service 210. Based on the reconfiguration request, the activation service identifies one or more reconfiguration actions to be performed to reconfigure the computing environment. Based on the identified reconfiguration actions, an estimation component 400 estimates or predicts an amount of time it will take to perform the actions and thus, to complete the reconfiguration. In one example, estimation component 400 estimates an amount of time it will take to perform the individual actions (e.g., t(c)) and those estimations are used to provide at least one estimated reconfiguration time for completing the reconfiguration (e.g., $T_{success}$, $T_{rollback}$).

Further, in one example, activation service 210 measures the amount of time it takes to prepare for the reconfiguration. For instance, it determines the amount of time it takes to compare the current configuration with the proposed configuration and to determine the reconfiguration actions to be performed to reconfigure the computing environment, based on the reconfiguration request. This measured time is used to determine the at least one estimated reconfiguration time for the reconfiguration. Further, in one example, the measured time is used by a monitor and calibrate component 410 to, for instance, recalculate the estimated reconfiguration time(s) and/or adjust the estimated reconfiguration time(s) based on the recalculation. A calibration value is output from monitor and calibrate component 410 and input, in one example, to estimation component 400 to provide additional data to the estimation component in performing estimated reconfiguration times in the future. Additionally, in one example, output from monitor and calibrate component 410 is a trigger for a prepare action component 430 which may provide, for instance, a notification regarding the reconfiguration and/or proactively initiate tasks prior to completing the reconfiguration. Further, outputs from estimation component 400 and monitor and calibrate component 410 are used to update a data structure, such as a Knowledge Base 420.

Further details of using the above-described components to reconfigure a computing environment based on a reconfiguration request are described with reference to FIGS. 5A-5B. In one example, there is a preparation phase 500 (FIG. 5A) and an activation phase 502 (FIG. 5B). Although in the description herein, certain components are described as performing certain functions, this is only one example. More, fewer and/or different components may perform the functions. Further, although a user is specified, the user may be any entity, including a processor. Many variations are possible.

Figure 5A:
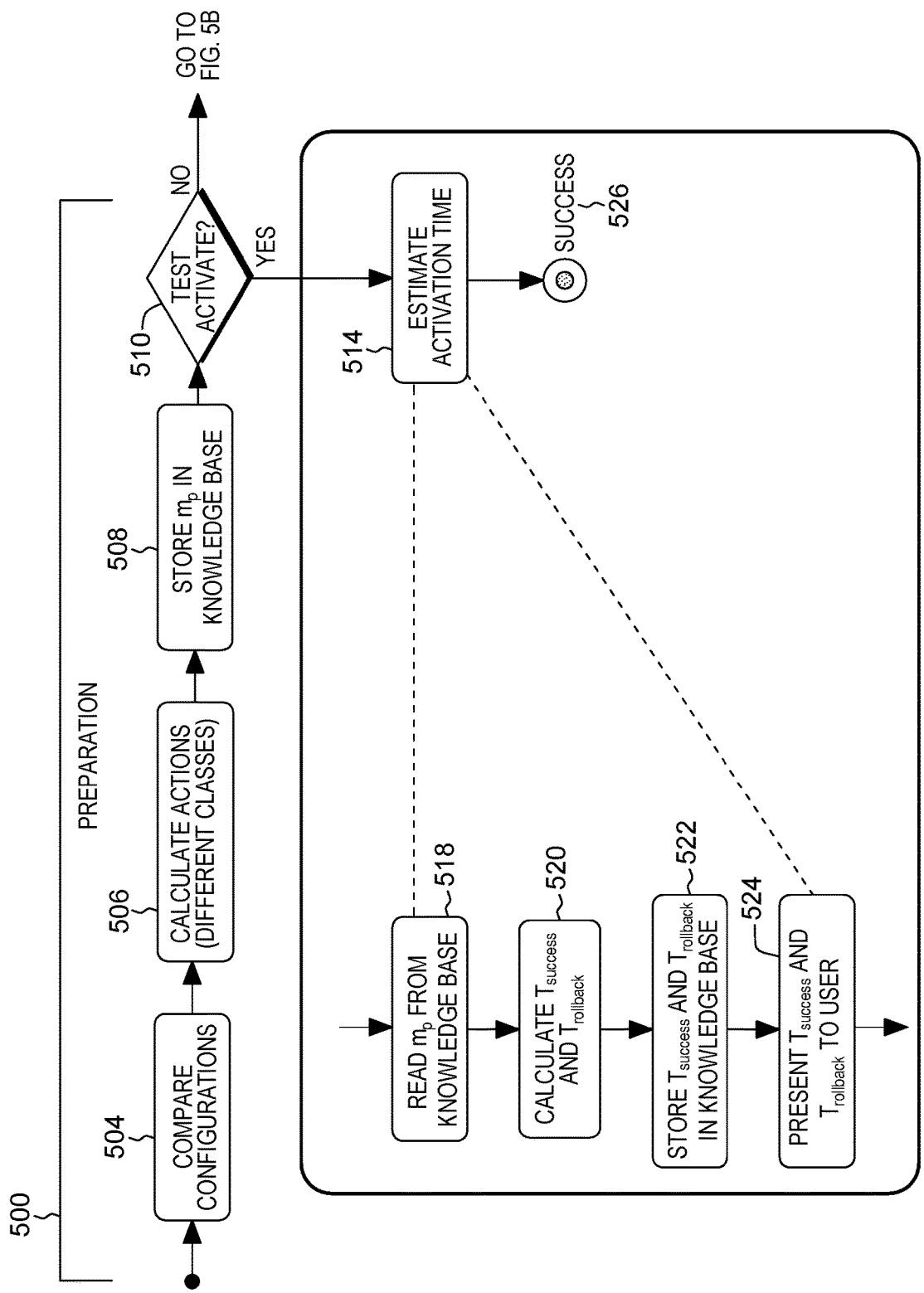
FIGS. 5A-5B depict further details of a reconfiguration process, in accordance with one or more aspects of the present invention.
Figure 5B:
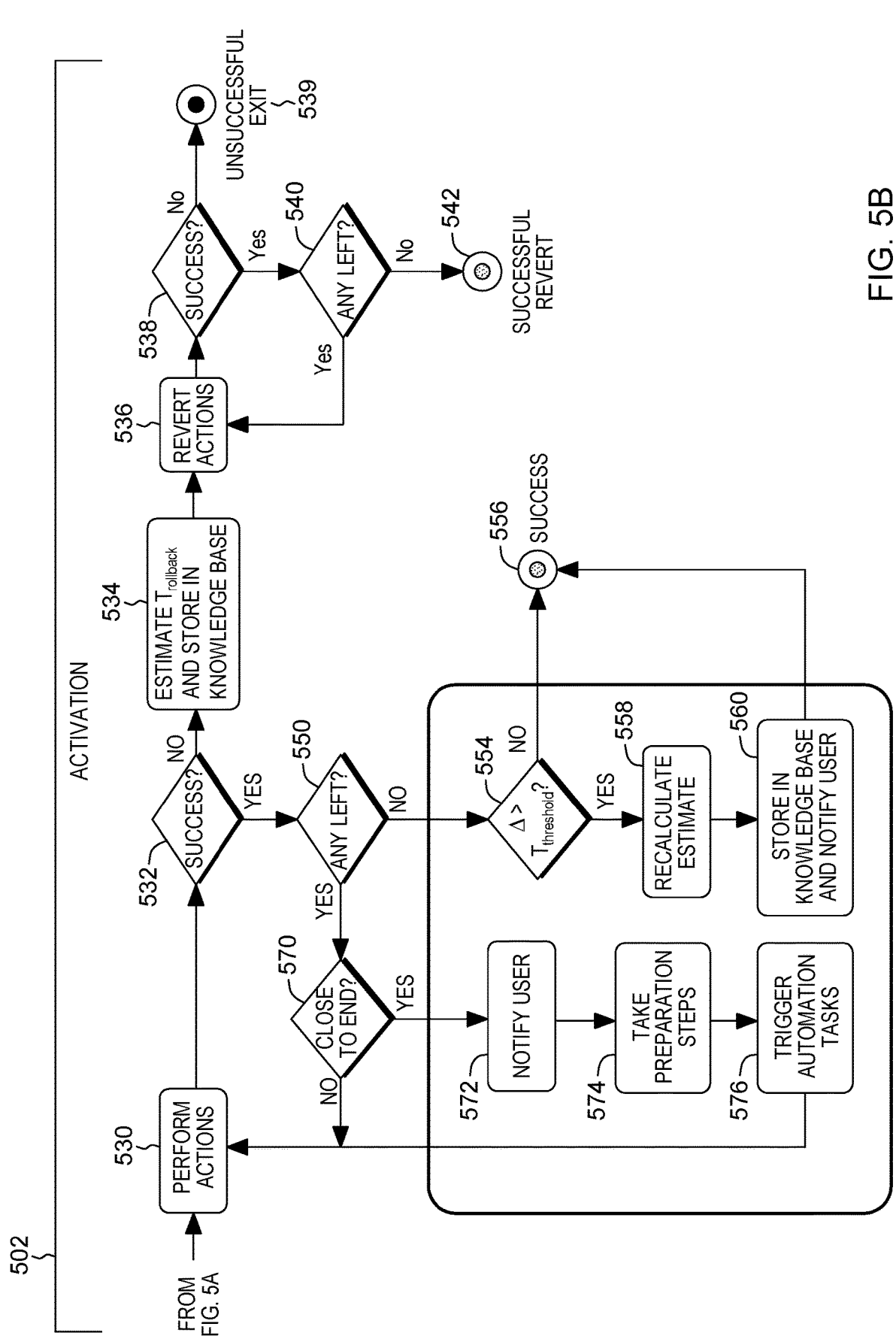

Referring initially to FIG. 5A, in one embodiment, during preparation phase 500, an activation service, such as activation service 210, obtains a configuration request and compares the requested configuration to, for instance, the existing configuration, STEP 504. Based on the comparison, activation service 210 determines, for instance, one or more hardware components (and optionally software components) being added, deleted and/or modified in the configuration. Activation service 210 then determines various reconfiguration actions (e.g., add, delete, modify, etc.) to be performed in order to reconfigure the computing environment, as requested, STEP 506. Further, activation service 210 determines (e.g., measures) how long it took to compare the configurations and to identify the reconfiguration actions to be used to reconfigure the environment. This measured value ($m_p$) is stored in a data structure, such as Knowledge Base 420, STEP 508.

A determination is made, based on the request, as to whether the request is for a test activation of the proposed configuration or an actual activation of the reconfiguration, INQUIRY 510. This determination is made by the activation service or another component. If it is a test activation, then estimation component 400 estimates, in one embodiment, at least one activation time (also referred to herein as at least one estimated reconfiguration time) for performing the identified actions to provide the requested reconfiguration, STEP 514. In one embodiment, estimation of the at least one activation time includes reading the measured preparation time ($m_p$) from a data structure, such as Knowledge Base 420, STEP 518, and calculating $T_{success}$ and $T_{rollback}$, as described above, STEP 520. Thereafter, $T_{success}$ and $T_{rollback}$ are stored in, for instance, Knowledge Base 420, STEP 522, and optionally, presented to the user, STEP 524. After the at least one activation time is estimated, estimation is complete, STEP 526. In one embodiment, the estimated time it takes to perform the individual actions may be used (e.g., added together) to determine an estimated reconfiguration time for the entire reconfiguration.

Returning to INQUIRY 510, if activation of the requested reconfiguration is to be performed, then with reference to FIG. 5B, activation service 210 performs a selected reconfiguration action of the one or more identified reconfiguration actions, STEP 530. If performance of the selected reconfiguration action is not successful for one reason or another, INQUIRY 532, then estimation component 400 estimates $T_{rollback}$ and stores it in, e.g., Knowledge Base 420, STEP 534. Activation service 210 rolls back the unsuccessful reconfiguration action, STEP 536. A determination is made as to whether the rollback was successful, INQUIRY 538. If it was unsuccessful, then the process exits as unsuccessful, STEP 539. However, if the reversion of the selected action is successful, then a further determination is made as to whether there are any other actions to be rollbacked, INQUIRY 540. For instance, is there at least one reconfiguration action that was previously performed that is to be rollbacked due to the failure of the selected action? Should there be a further reconfiguration action to be rollbacked, then processing continues with STEP 536. Otherwise, processing continues to a successful revert exit, STEP 542.

Returning to INQUIRY 532, if performance of the selected reconfiguration action is successful, then a further determination is made as to whether there are more reconfiguration actions to be performed, INQUIRY 550. If there are no further reconfiguration actions to be performed, then estimated reconfiguration times for the reconfiguration determined in STEP 514 (FIG. 5A) are compared to actual measurements made during the reconfiguration process to determine a difference between the estimated times and the actual times (delta). A determination is made as to whether the delta is greater than a predefined value (e.g., user defined), referred to as $T_{threshold}$, INQUIRY 554. If delta is not greater than $T_{threshold}$, then the reconfiguration of the requested hardware is successful, STEP 556. However, if delta is greater than $T_{threshold}$, then the estimated reconfiguration times are recalculated using, for instance, actual measured times of the reconfiguration, STEP 558, and the recalculated or adjusted times are stored in Knowledge Base 420, STEP 560. The user is also notified, in one example, of the recalculated estimates, STEP 560, and the process ends with a successful reconfiguration, STEP 556.

Returning to INQUIRY 550, if there are one or more reconfiguration actions left to be performed, then a further determination is made as to whether it is close to the end of performing the reconfiguration actions, INQUIRY 570. For instance, is there a certain amount of estimated reconfiguration time remaining? Has the estimated time of the remaining reconfiguration actions fallen below a given threshold, which is, e.g., user specified? As a specific example, a user provides a target "Do task xy 5 minutes prior to completion." Thus, in this example, if there are, e.g., 5 minutes left, then it is close to the end. Additionally, a determination may be made as to whether there are only certain types of reconfiguration actions left to be performed, such as add actions, or whether a particular group of actions has completed, such as delete actions. In this scenario, an estimation of the amount of reconfiguration time remaining may be calculated and used to determine if it is close to the end (e.g., within a certain amount of remaining time, below a threshold, etc.), and thus, indicating whether selected tasks may be performed. Other examples are possible. If it is not close to the end, then processing continues to STEP 530. However, if it is close to the end, then, in one example, the user is notified, STEP 572.

Additionally, preparation steps are taken, STEP 574. For instance, a real-time completion probability score (P_Score) is determined, which is based on completion history data (e.g., stored in a data structure, such as Knowledge Base 420) and on actual progress of completion during performance of the reconfiguration. Further, a probability threshold is determined based on the cost for unrolling one or more reconfiguration actions (e.g., one or more reconfiguration actions still to be performed and/or one or more predecessor reconfiguration actions). For instance, a default threshold probability is provided (e.g., 95%) or a user-provided value overriding the default value is provided. Based on the real-time completion probability score and the probability threshold, a start time for an automation task, such as a next hardware reconfiguration action or a next workload processing task, as examples, is determined.

A specific example of determining an empirical probability includes: the probability that an action fails:

$$p_{fail} = \frac{a_{fail}}{a_{total}},$$

where $a_{fail}$ is the number of reconfiguration actions that ever failed and $a_{total}$ is the number of reconfiguration actions that were ever executed. The probability score (probability that the process is successful): $p_{score}=(1-p_{fail})^n$, where n is the number of remaining reconfiguration actions.

Based on, for instance, the above preparation, and in particular, based on, for instance, having a certain level of confidence (e.g., a certain percentage equal to or above the probability threshold), one or more automation tasks are triggered, STEP 576. As examples, a migration of workload may be initiated to activate the configuration in a mirrored data center; a next reconfiguration action of the same or a different reconfiguration is scheduled; and/or a user is notified, etc. The selected tasks are initiated prior to completing the reconfiguration and based on at least the estimated reconfiguration time (e.g., $T_{success}$ and/or $T_{rollback}$).

Processing continues to STEP 530.

In one embodiment, to trigger one or more automation tasks, the list of reconfiguration actions identified by activation service 210 is sorted first by type of change (e.g., delete, modify, add) and then, hierarchically by type of affected element (e.g., partition, channel path, device, etc.). One example sort includes: deleted access for elements, deleted elements, modified elements, added elements, and added access elements.

In one embodiment, automation tasks can be triggered after any of these change groups have been activated and prior to completing the entire reconfiguration. As one example, when there are only elements to be added, the process can heuristically be considered to have a high chance of success, and therefore, one or more tasks (e.g., one or more follow-on tasks), such as migration of a workload can be initiated as preparation to activate the configuration in a mirrored data center, for example. As a further example, after more critical actions, e.g., deleting an element, have been processed and are close to the end, one or more tasks can be initiated. An estimated end of activation may be recalculated and refined after each of these change groups have been activated.

Figure 6:
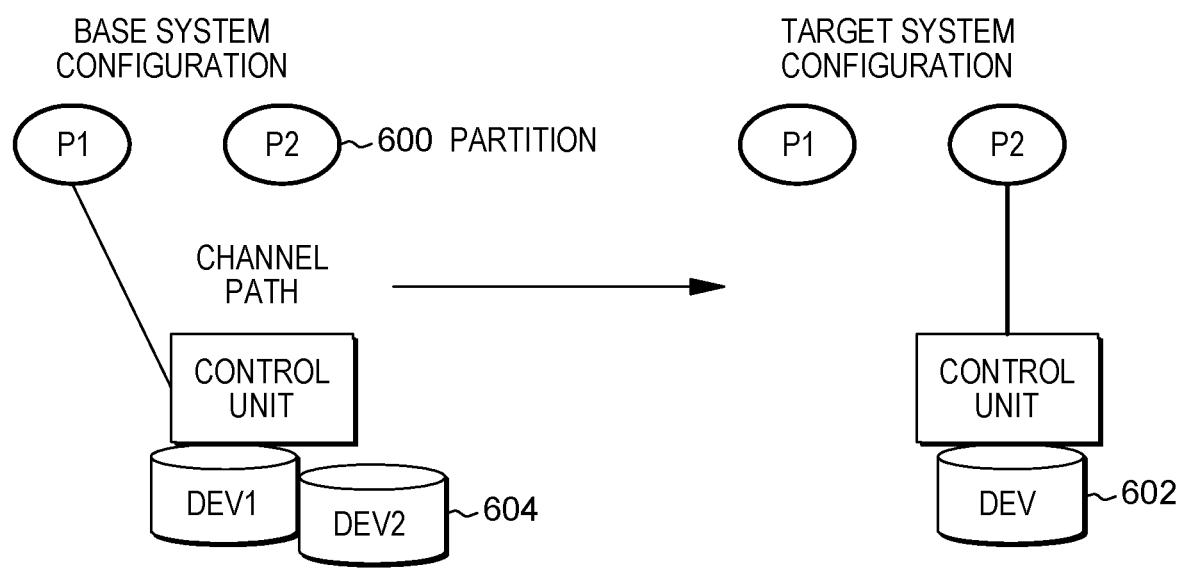
FIG. 6 depicts one example of a reconfigured system, in accordance with an aspect of the present invention.

One particular reconfiguration example is depicted in FIG. 6. In this example, an existing partition (e.g., Partition 2 (P2) 600) is to have access to a device 602 and an existing device 604 (its logical definition) is to be deleted. The required changes are determined and sorted by type, as described above. Then, in one embodiment, the actions to delete are processed first. Then, the remaining actions are to grant partitions access to the elements. Before this action is initiated, the trigger could detect that only access additions are remaining and could trigger follow-on tasks (e.g., based on the estimated time remaining to perform the reconfiguration).

In accordance with one or more aspects, selected tasks (e.g., follow-on tasks) are proactively performed (e.g., initiated and/or processed) based on estimated reconfiguration times. In one example, a system reconfiguration (e.g., dynamic hardware reconfiguration) capability is provided that measures the time used to determine one or more reconfiguration actions to be performed to reconfigure a computing environment, and that estimates, in advance of performing the reconfiguration, how long it will take to perform the one or more reconfiguration actions. This estimated reconfiguration time is used to proactively initiate selected tasks prior to completing the reconfiguration (i.e., prior to completing processing of the one or more reconfiguration actions used to reconfigure). This enables those tasks to be processed as soon as possible, keeping system downtime to a minimum.

A further aspect includes recalculating the estimated reconfiguration time(s) using measured reconfiguration times determined during processing of the one or more reconfiguration actions in order to adjust the estimated reconfiguration time(s). This improves the estimated reconfiguration time(s) enabling future reconfiguration time(s) to be estimated with a higher accuracy.

A proactive approach is provided to estimate the confidence and time to react to a system reconfiguration and its estimated completion time. A good estimation of the total completion time with high confidence is provided to be able to initiate subsequent process steps, as soon as possible, to reduce system downtime and keep system downtime to a minimum.

In accordance with one or more aspects, an accurate estimation of a time it takes to perform reconfiguration (thus, providing a maintenance window) is provided. A real-time progress view is provided, as well as a rollback time estimate. This enables an accurate scheduling of the maintenance window, confidence in reconfiguration tasks, and minimizing downtimes of systems.

One or more aspects of the present invention are inextricably tied to computer technology and facilitate processing within a computing environment. A capability is provided to minimize downtime of a system being reconfigured by proactively performing certain tasks prior to completing reconfiguration. This improves system performance.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

Figure 7A:
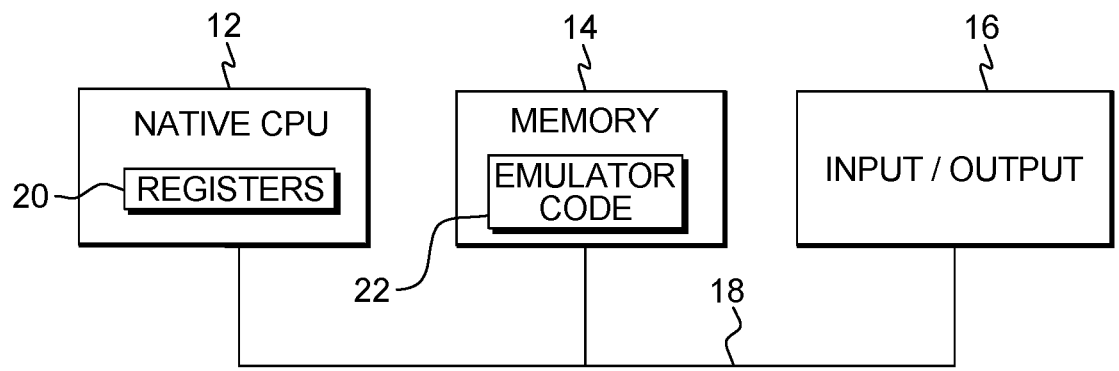
FIG. 7A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
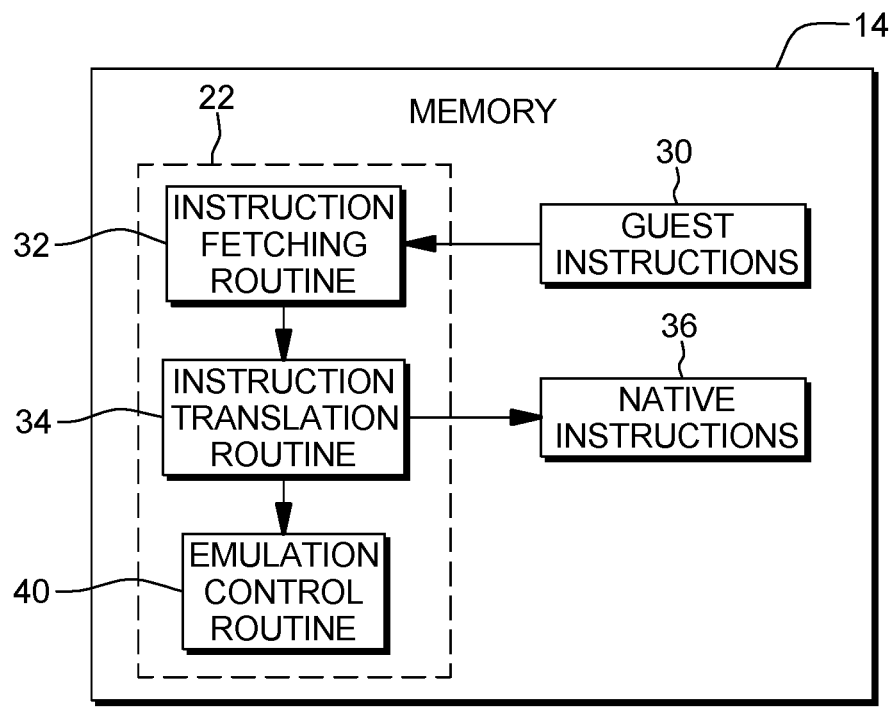
FIG. 7B depicts further details of the memory of FIG. 7A.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for hardware reconfiguration in accordance with one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
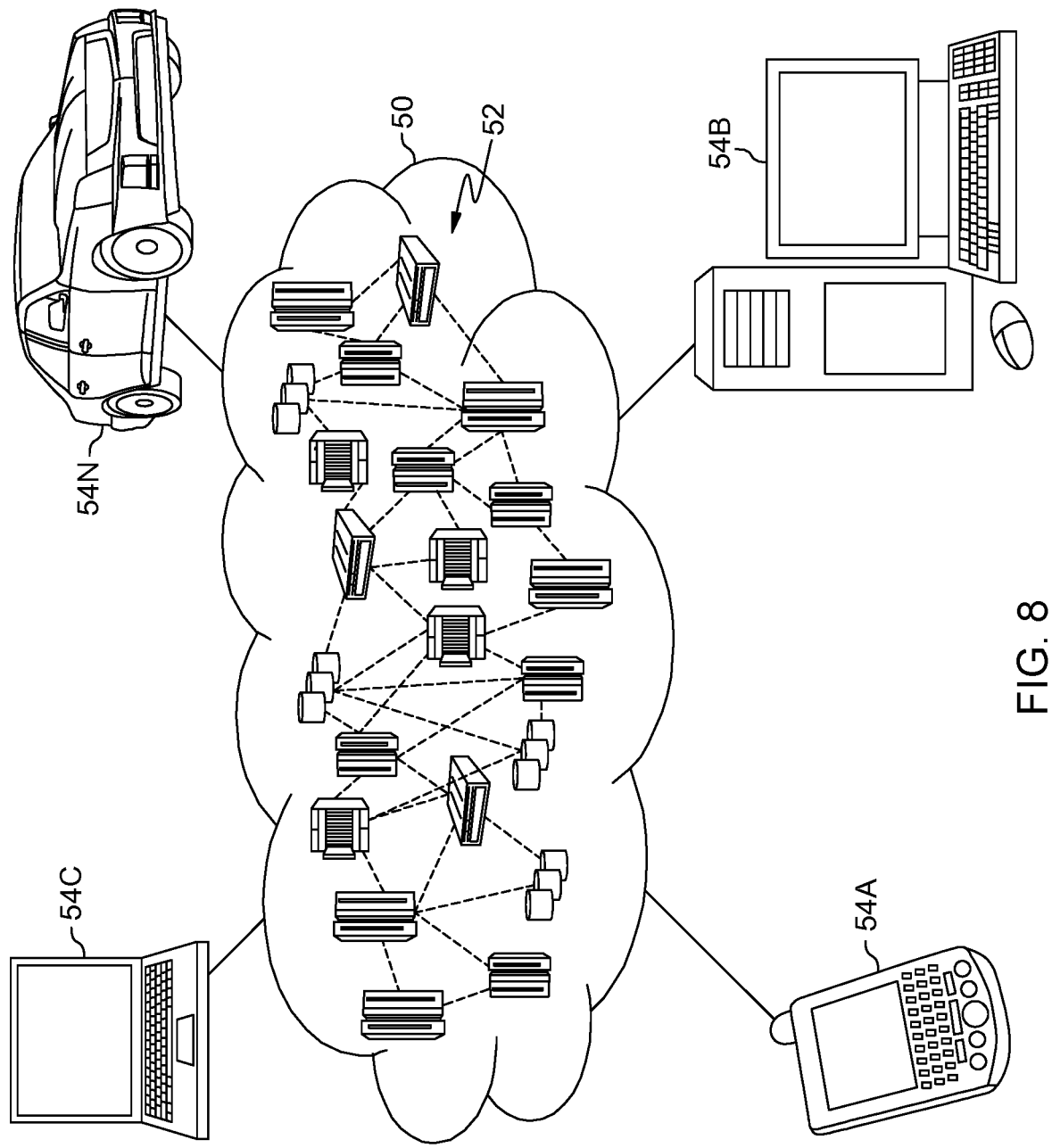
FIG. 8 depicts one embodiment of a cloud computing environment.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
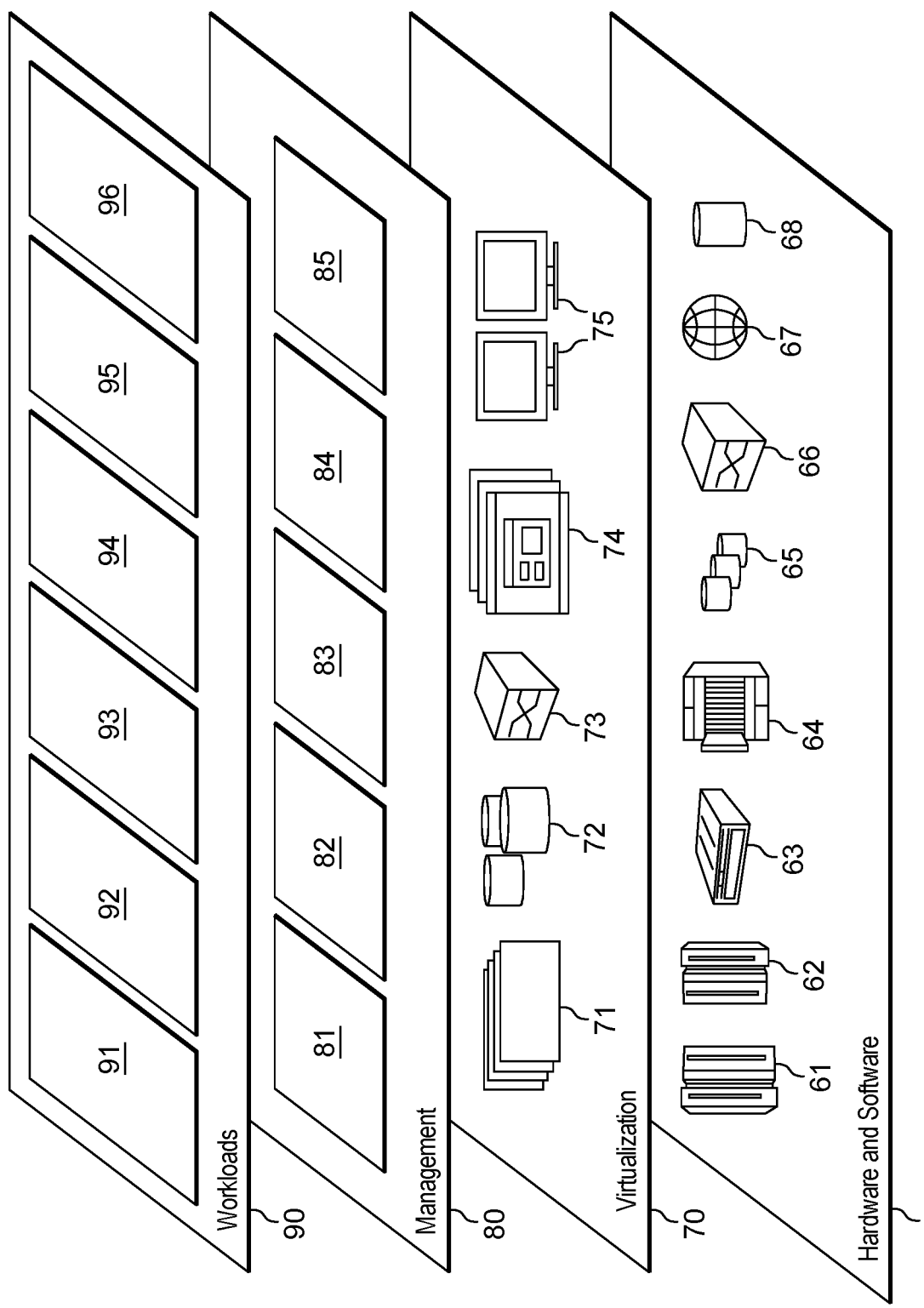
FIG. 9 depicts one example of abstraction model layers.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hardware reconfiguration processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Additionally, other components may be used and/or take advantage of one or more aspects of the present invention. Moreover, other types of reconfigurations may be performed. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   at least one computer readable storage medium readable by at least one processing circuit and storing instructions for performing a method comprising:
      determining, prior to performing one or more reconfiguration actions to reconfigure a configuration of the computing environment, at least one estimated reconfiguration time to perform the one or more reconfiguration actions;
      performing at least one reconfiguration action of the one or more reconfiguration actions; and initiating one or more tasks prior to completing the one or more reconfiguration actions, wherein the initiating is based on the at least one estimated reconfiguration time.

2. The computer program product of claim 1, wherein the method further comprises:
   determining a real-time completion probability score based on completion history data and actual progress of completing the one or more reconfiguration actions;
   determining a probability threshold based on a cost of rolling back at least one reconfiguration action of the one or more reconfiguration actions; and
   determining a start time for a task of the one or more tasks, based on the real-time completion probability and the probability threshold.

3. The computer program product of claim 2, wherein the task comprises a next hardware reconfiguration action to be performed or a workload processing action.

4. The computer program product of claim 1, wherein the determining the at least one estimated reconfiguration time includes:
   obtaining a measurement from a data structure, the measurement being a measure of a time it takes to compare a current configuration and a requested configuration and a time it takes to identify the one or more reconfiguration actions to provide the requested configuration; and
   determining a time for a successful reconfiguration and a time for a rollback for the one or more reconfiguration actions.

5. The computer program product of claim 1, wherein the method further comprises adjusting an estimated reconfiguration time of the at least one estimated reconfiguration time based on at least one measured reconfiguration time determined based on performing at least one reconfiguration action of the one or more reconfiguration actions.

6. The computer program product of claim 1, wherein the method further includes:
   obtaining a request to reconfigure the configuration of the computing environment; and
   identifying, based on obtaining the request, the one or more reconfiguration actions to be used to reconfigure the configuration.

7. The computer program product of claim 6, wherein the determining the at least one estimated reconfiguration time includes estimating at least one reconfiguration time for each reconfiguration action of the one or more reconfiguration actions that are identified to be used to reconfigure the configuration.

8. The computer program product of claim 1, wherein the method further comprises performing the one or more reconfiguration actions subsequent to determining the at least one estimated reconfiguration time.

9. The computer program product of claim 8, wherein the method further comprises measuring at least one reconfiguration time based on performing the one or more reconfiguration actions, the measuring providing at least one measured reconfiguration time.

10. The computer program product of claim 1, wherein the reconfiguration comprises a hardware configuration of the computing environment.

11. A computer system for facilitating processing within a computing environment, the computer system comprising:
   a memory; and
   at least one processor configured to perform:
      determining, prior to performing one or more reconfiguration actions to reconfigure a configuration of the computing environment, at least one estimated reconfiguration time to perform the one or more reconfiguration actions;
      performing at least one reconfiguration action of the one or more reconfiguration actions; and
      initiating one or more tasks prior to completing the one or more reconfiguration actions, wherein the initiating is based on the at least one estimated reconfiguration time.

12. The computer system of claim 11, wherein the method further comprises:
   determining a real-time completion probability score based on completion history data and actual progress of completing the one or more reconfiguration actions;
   determining a probability threshold based on a cost of rolling back at least one reconfiguration action of the one or more reconfiguration actions; and
   determining a start time for a task of the one or more tasks, based on the real-time completion probability and the probability threshold.

13. The computer system of claim 11, wherein the determining the at least one estimated reconfiguration time includes:
   obtaining a measurement from a data structure, the measurement being a measure of a time it takes to compare a current configuration and a requested configuration and a time it takes to identify the one or more reconfiguration actions to provide the requested configuration; and
   determining a time for a successful reconfiguration and a time for a rollback for the one or more reconfiguration actions.

14. The computer system of claim 11, wherein the method further comprises adjusting an estimated reconfiguration time of the at least one estimated reconfiguration time based on at least one measured reconfiguration time determined based on performing at least one reconfiguration action of the one or more reconfiguration actions.

15. The computer system of claim 11, wherein the method further includes:
   obtaining a request to reconfigure the configuration of the computing environment; and
   identifying, based on obtaining the request, the one or more reconfiguration actions to be used to reconfigure the configuration.

16. A computer-implemented method of facilitating processing within a computing environment, the computer-implemented method comprising:
   determining, prior to performing one or more reconfiguration actions to reconfigure a configuration of the computing environment, at least one estimated reconfiguration time to perform the one or more reconfiguration actions;
   performing at least one reconfiguration action of the one or more reconfiguration actions; and
   initiating one or more tasks prior to completing the one or more reconfiguration actions, wherein the initiating is based on the at least one estimated reconfiguration time.

17. The computer-implemented method of claim 16, further comprising:
   determining a real-time completion probability score based on completion history data and actual progress of completing the one or more reconfiguration actions;
   determining a probability threshold based on a cost of rolling back at least one reconfiguration action of the one or more reconfiguration actions; and determining a start time for a task of the one or more tasks, based on the real-time completion probability and the probability threshold.

18. The computer-implemented method of claim 16, wherein the determining the at least one estimated reconfiguration time includes:
   obtaining a measurement from a data structure, the measurement being a measure of a time it takes to compare a current configuration and a requested configuration and a time it takes to identify the one or more reconfiguration actions to provide the requested configuration; and
   determining a time for a successful reconfiguration and a time for a rollback for at least one reconfiguration action of the one or more reconfiguration actions.

19. The computer-implemented method of claim 16, further comprising adjusting an estimated reconfiguration time of the at least one estimated reconfiguration time based on at least one measured reconfiguration time determined based on performing at least one reconfiguration action of the one or more reconfiguration actions.

20. The computer-implemented method of claim 16, further comprising:
   obtaining a request to reconfigure the configuration of the computing environment; and
   identifying, based on obtaining the request, the one or more reconfiguration actions to be used to reconfigure the configuration.

* * * * *